(12) United States Patent
Harris

(10) Patent No.: US 6,876,113 B1
(45) Date of Patent: Apr. 5, 2005

(54) ALTERNATORS AND IMPROVEMENTS TO ROTARY INTERNAL COMBUSTION ENGINES

(76) Inventor: David Jonathan Harris, 15 Kingsley Avenue, Borehamwood Herts (GB), WD6 4LY ( * ) Notice: Subject to any disclaimer, the term of this patent is extended or adjusted under 35 U.S.C. 154(b) by 0 days.

(21) Appl. No.: 09/979,934

(22) PCT Filed: May 25, 2000

(86) PCT No.: PCT/GB00/02031

§ 371 (c)(1),
(2), (4) Date: Nov. 26, 2001

(87) PCT Pub. No.: WO00/71888

PCT Pub. Date: Nov. 30, 2000

(30) Foreign Application Priority Data

| May 25, 1999 | (GB) | 9912092 |
| May 28, 1999 | (GB) | 9912471 |
| Jul. 9, 1999 | (GB) | 9916191 |

(51) Int. Cl.[7] .................................. H02K 5/00
(52) U.S. Cl. .................... 310/114; 310/263; 310/90; 290/6; 123/3
(58) Field of Search .................. 310/263, 112–114, 310/74, 90, 91, 67 A, 75 C, 153, 101, 102 R, 126, 264, 266, 268, 67 R; 290/6, 52; 123/3

(56) References Cited

U.S. PATENT DOCUMENTS

| 1,224,535 A | * | 5/1917 | Hamm ............. 123/149 D |
| 2,312,101 A | * | 2/1943 | Merrill et al. ........ 310/156.38 |
| 3,132,272 A | * | 5/1964 | MacFarlane ............. 310/168 |
| 3,206,623 A | * | 9/1965 | Snowdon ............. 310/162 |
| 3,303,369 A | * | 2/1967 | Erickson ............. 310/168 |
| 3,459,980 A | * | 8/1969 | Coroller ............. 310/114 |
| 3,553,510 A | * | 1/1971 | Howey ............. 310/156.72 |
| 3,694,661 A | * | 9/1972 | Minowa ............. 290/1 R |
| 3,713,015 A | * | 1/1973 | Frister ............. 322/28 |
| 4,286,187 A | | 8/1981 | Binder ............. 310/91 |
| 4,305,031 A | * | 12/1981 | Wharton ............. 322/29 |
| 4,337,406 A | * | 6/1982 | Binder ............. 310/91 |
| 4,613,761 A | * | 9/1986 | Yabunaka ............. 290/36 R |
| 4,980,595 A | * | 12/1990 | Arora ............. 310/263 |
| 5,177,388 A | * | 1/1993 | Hotta et al. ............. 310/114 |
| 5,177,391 A | * | 1/1993 | Kusase ............. 310/263 |
| 5,530,305 A | * | 6/1996 | Krueger et al. ............. 310/74 |
| 5,912,516 A | * | 6/1999 | Atkinson et al. ......... 310/67 R |
| 5,936,320 A | * | 8/1999 | Takeda et al. ............. 310/89 |
| 5,955,807 A | * | 9/1999 | Kajiura et al. ......... 310/156.66 |
| 6,133,659 A | * | 10/2000 | Rao ............. 310/89 |

FOREIGN PATENT DOCUMENTS

| FR | 481864 | 1/1917 |
| FR | 1086302 | 2/1955 |
| GB | 1316814 | 5/1973 |
| JP | 03 036944 | 2/1991 |
| JP | 03 212137 | 9/1991 |
| JP | 06 217493 | 8/1994 |
| WO | WO 98 44620 | 10/1998 |

OTHER PUBLICATIONS

International Search Report dated Oct. 20, 2000, For PCT/GB00/02031.

* cited by examiner

Primary Examiner—Dang Le
(74) Attorney, Agent, or Firm—Rothwell, Figg, Ernst & Manbeck, p.c.

(57) ABSTRACT

The present invention provides improved alternators for use alone or in combination with, for example, rotary internal combustion engines wherein the alternators are characterised by absence of moveable bearings or mountability to existing driving shafts by use of an aligning plate and through passage through the rotor of the alternator to mount to the driving shaft. The alternators may be further characterised by plural rotors on the rotor driving shaft. The rotary internal combustion engines of the present invention are characterised by fixed size combustion chambers formed of radial recesses around a rotor amongst other features.

3 Claims, 11 Drawing Sheets

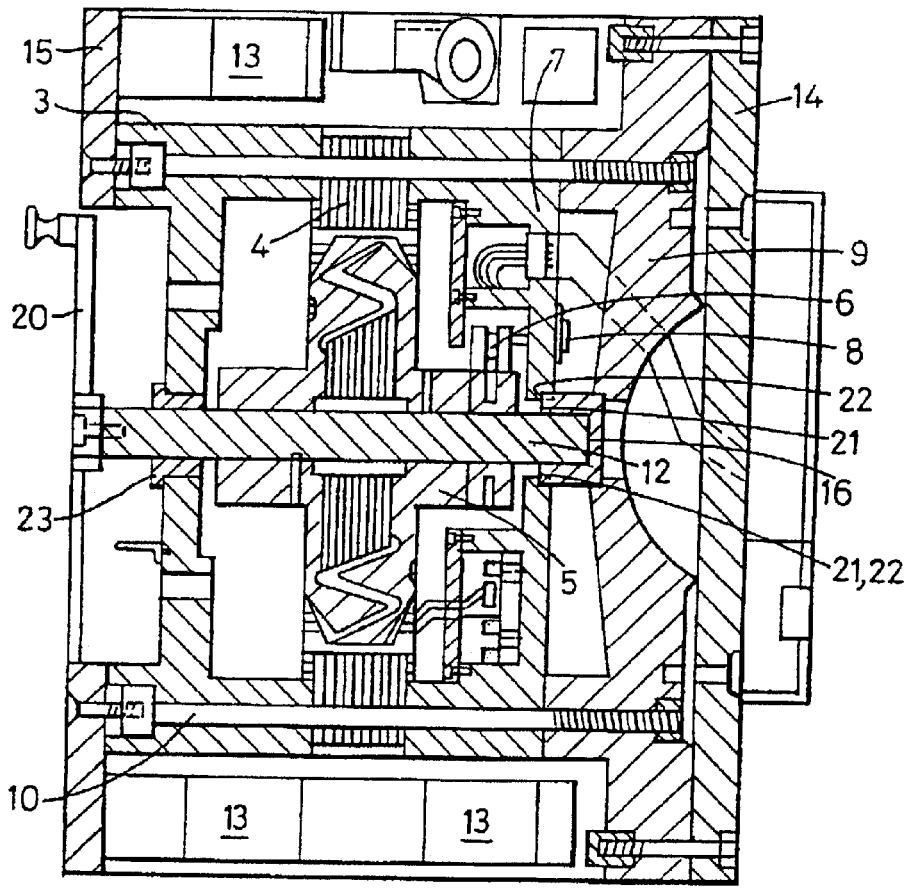
Fig. 3
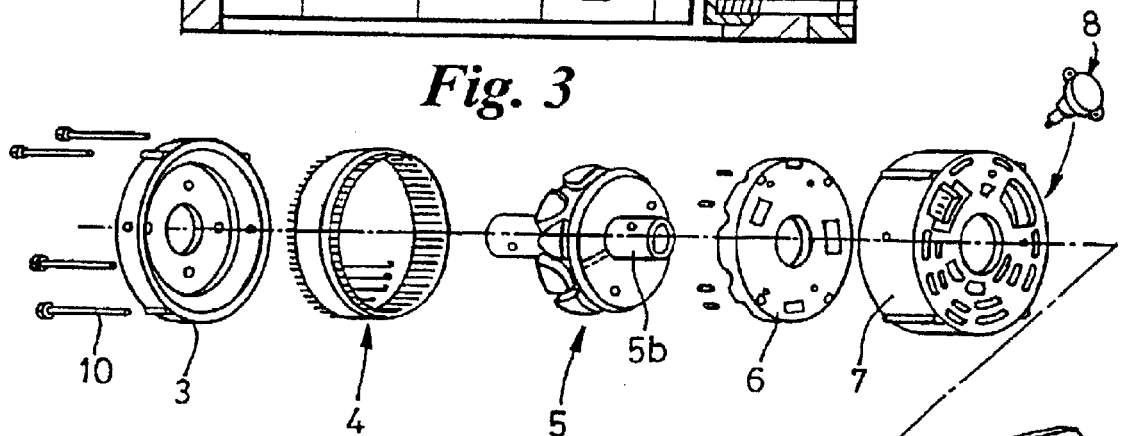
Fig. 4
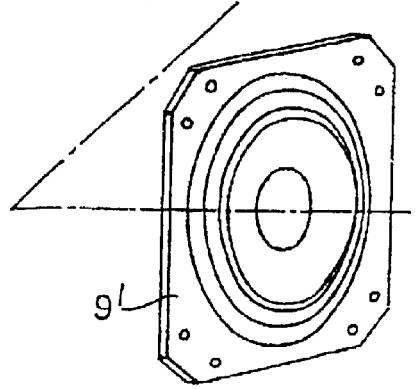

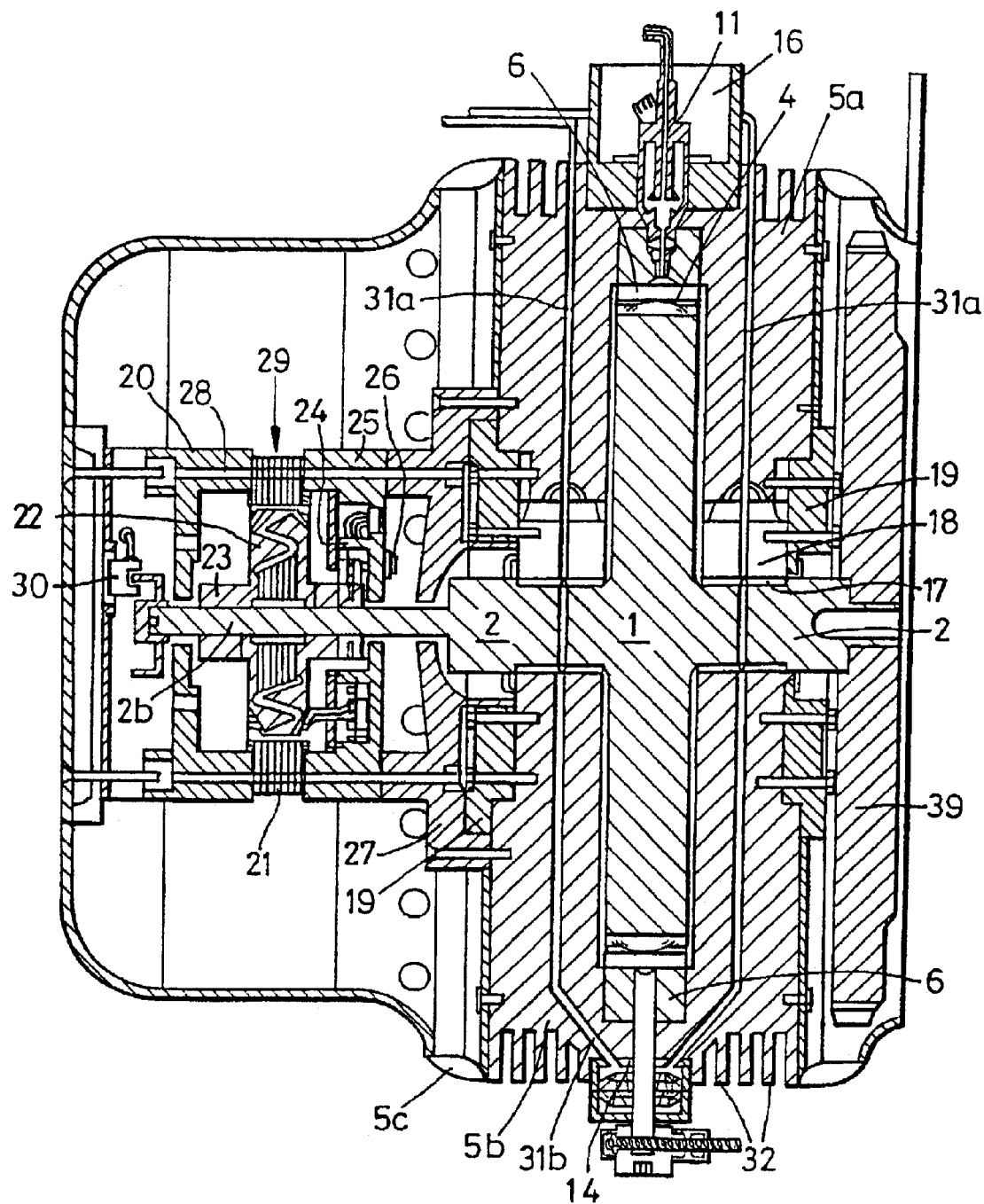
*Fig. B1*

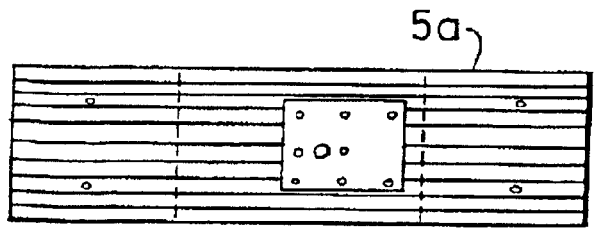
*Fig. B2*
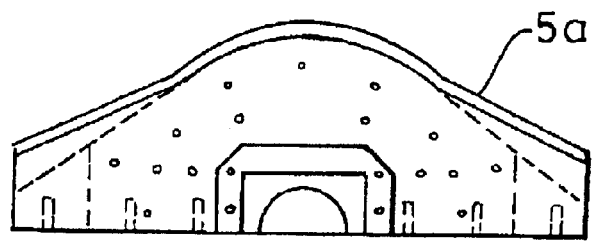
*Fig. B3*
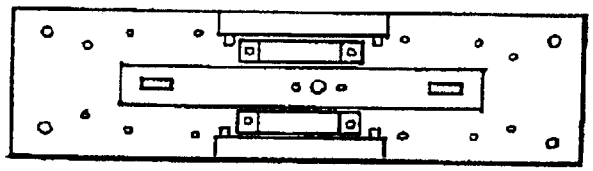
*Fig. B4*
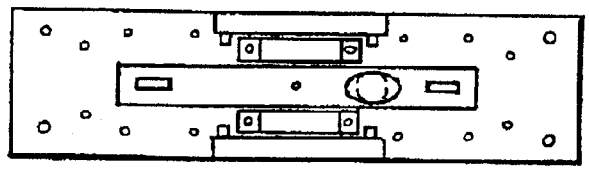
*Fig. B5*
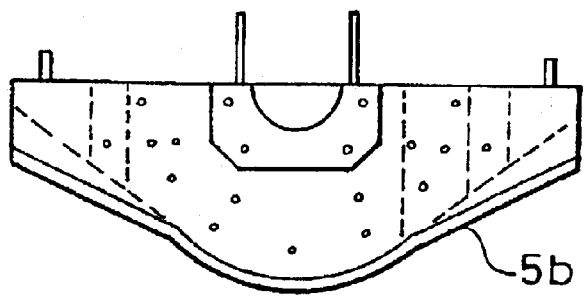
*Fig. B6*
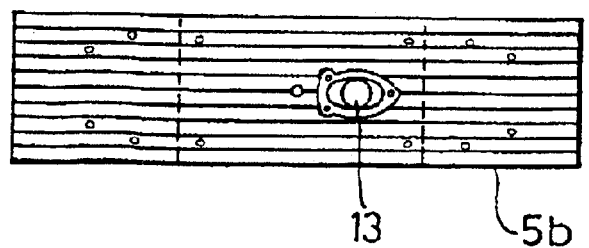
*Fig. B7*

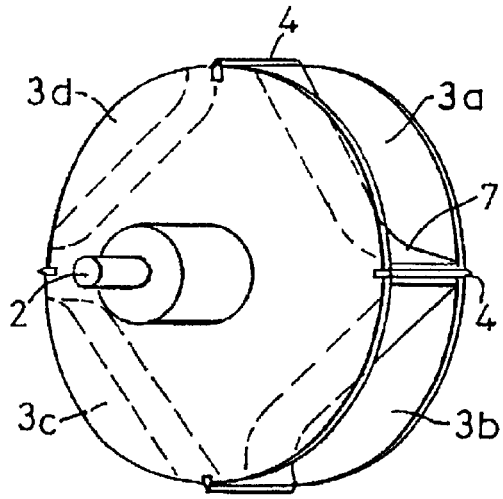
*Fig. B8*
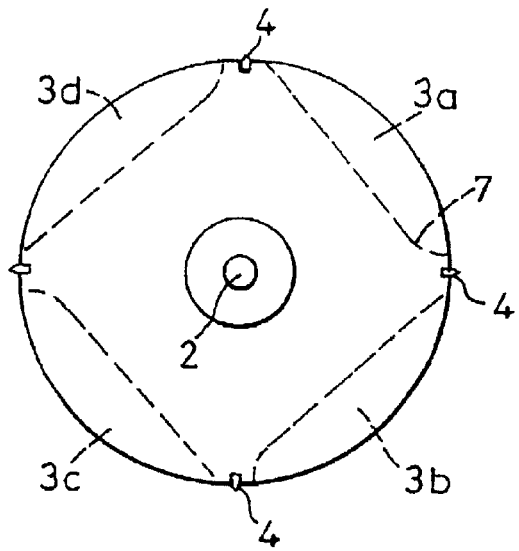
*Fig. B9*
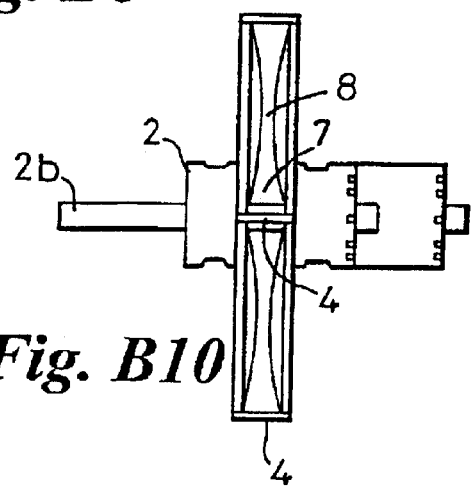
*Fig. B10*
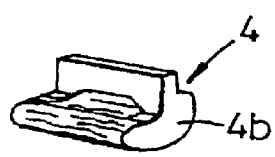
*Fig. B11A*
*Fig. B11B*
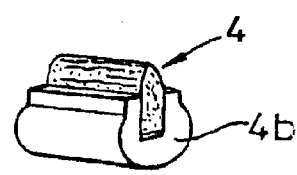
*Fig. B11C*

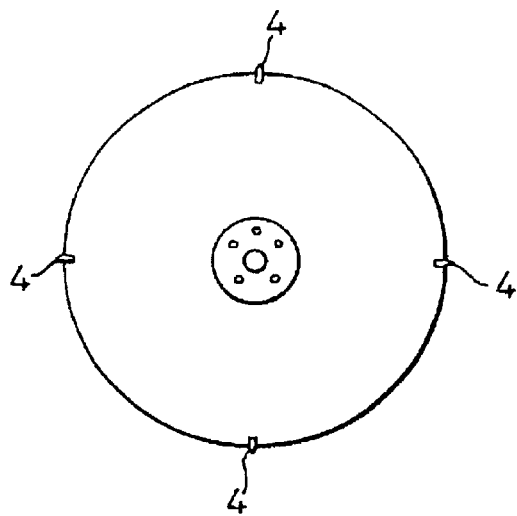
*Fig. B12*
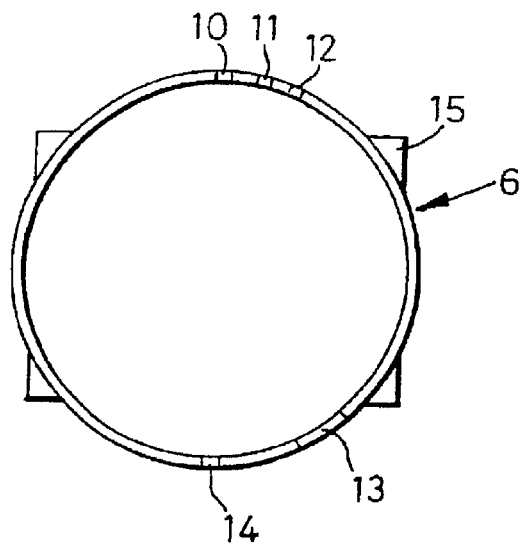
*Fig. B13*
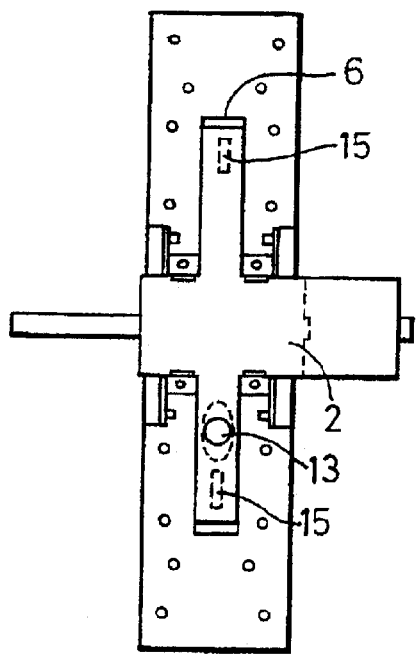
*Fig. B14*
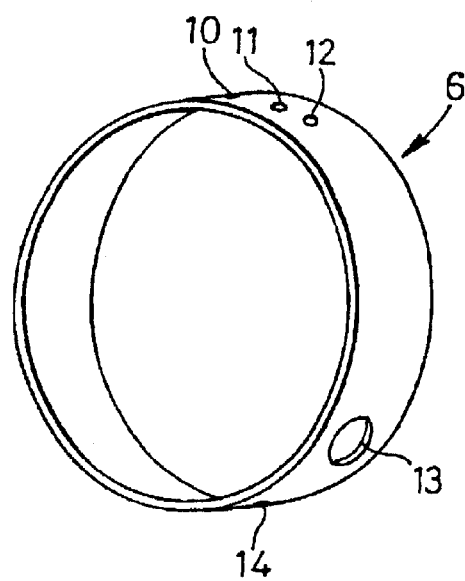
*Fig. B15*

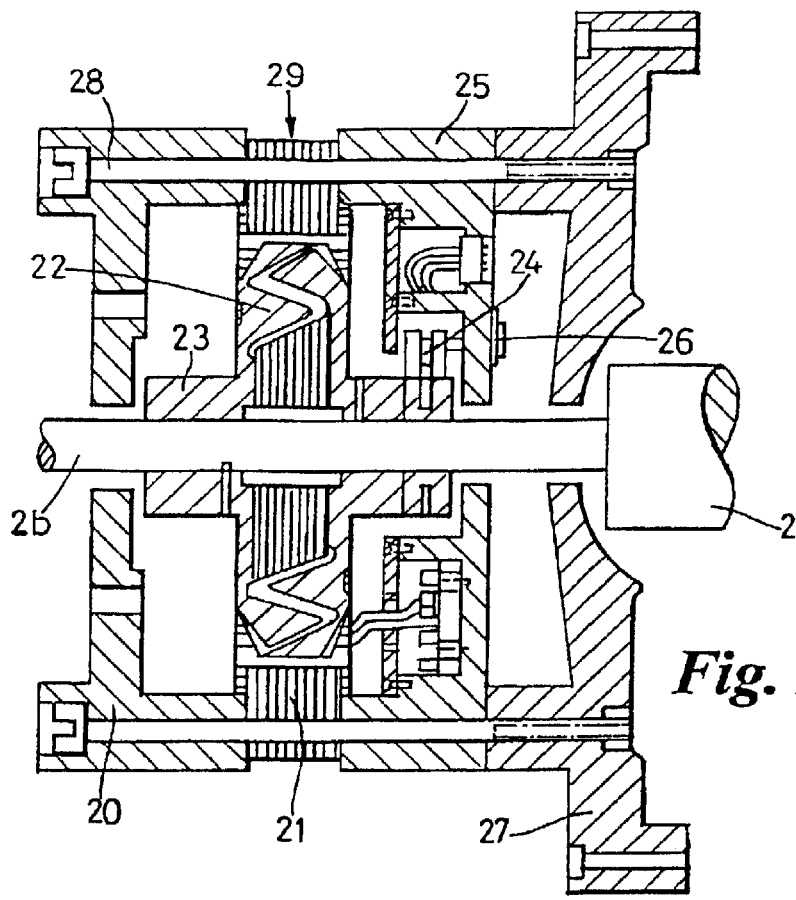
*Fig. B16*
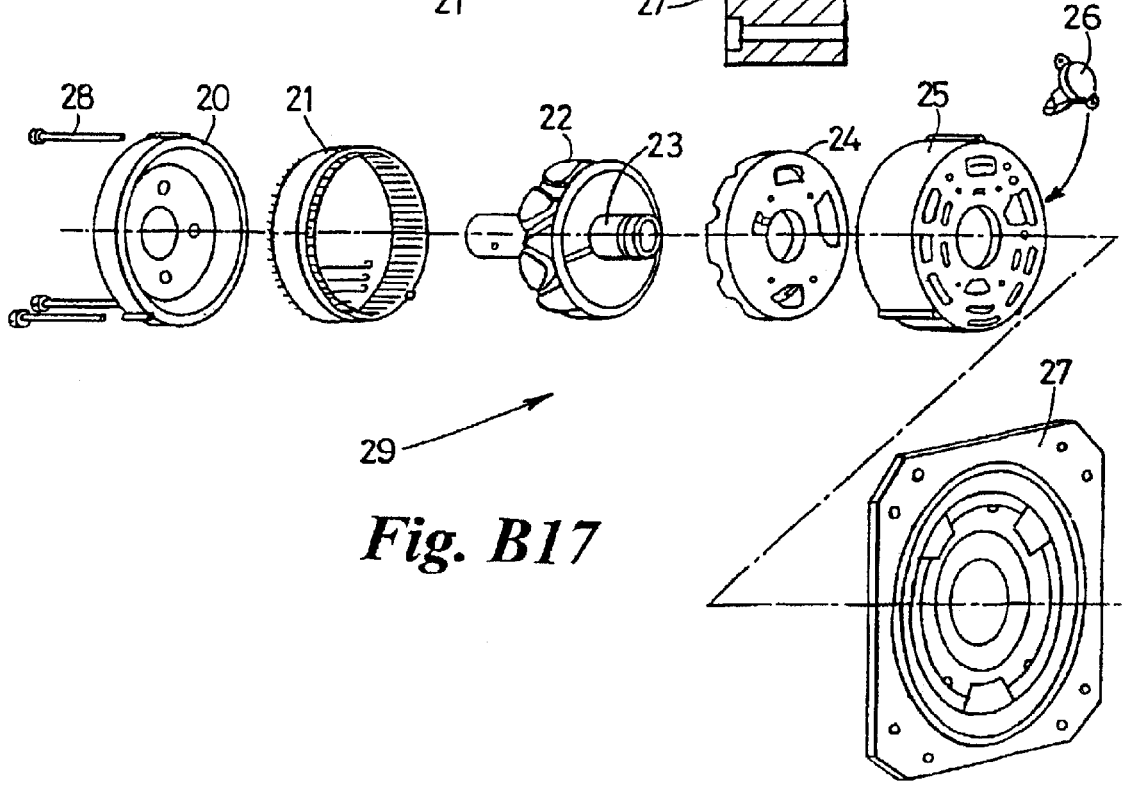
*Fig. B17*

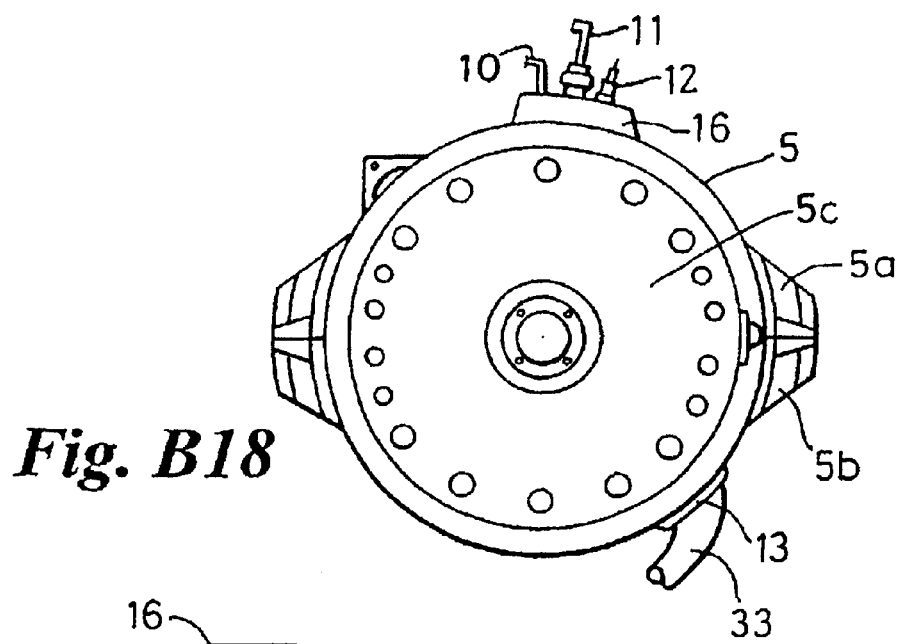
*Fig. B18*
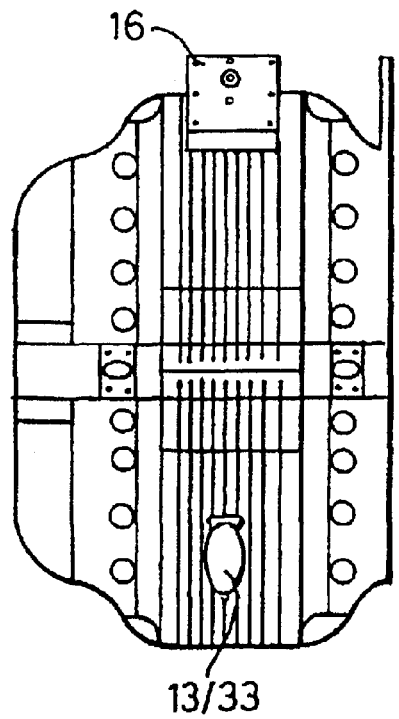
*Fig. B19*
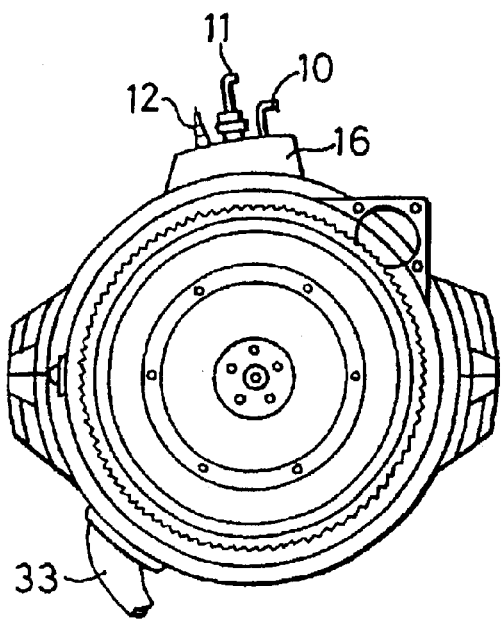
*Fig. B20*

ALTERNATORS AND IMPROVEMENTS TO ROTARY INTERNAL COMBUSTION ENGINES

FIELD OF THE INVENTION

In one aspect the present invention relates to alternators whether with rectification, to provide direct current, or unrectified which may be used for example, in conjunction with rotary internal combustion engines. In another aspect the present invention relates to improvements to rotary internal combustion engines.

BACKGROUND TO THE INVENTION (A) Alternators

The alternator has its origins dating back as far as 1831 when Michael Faraday first performed experiments involving passing a magnet back and forth within a coil of wire to generate electrical current within the coil circuit by electromagnetic induction. Over the many years since then a multitude of alternator designs have been developed for a range of different applications. Nevertheless, the basic design of the alternator has not changed substantially. The wiring configuration of the coil around the stator may take a number of different forms and the rotor may have any number of magnetic poles and varying shapes but is nevertheless consistently assembled as a substantially integral unit with the drive shaft. The positioning of the rotor drive shaft within the alternator housing is fixed and defined by moving bearings such as ball bearings or needle or cased bearings that support the drive shaft on each side of the rotor within the alternator housing.

During development of a new and improved type of rotary engine, the substantial limitations of conventional alternator assembly became apparent. Not only can the conventional alternator assemblies not be disassembled with optimal ease and not only are they vulnerable to wear of the movable bearing components and associated parts but their overall construction delimited by the moveable bearings severely restricts the ability of the alternator unit to have anything other than a single rotor mounted to the alternator's drive shaft These unaddressed limitations of existing alternator design may even have been partly responsible for the motor industry's failure to overcome the low efficiency of alternator re-charging of car batteries that has hampered development of viable electrically powered vehicles.

(B) Rotary Internal Combustion Engine

It is widely appreciated that the conventional reciprocating piston internal combustion engine is an inefficient system. Despite the fact that they constitute by far the greatest majority of all present-day motor vehicle engines their efficiency is often rated to be as low as 20 to 25% in converting the fuel energy into work. This is in part due to the fact that in the four stroke cycle, only one of the four strokes delivers power, the remaining strokes for fuel intake, compression and exhaust of the combusted fuel do not deliver power. The firing of the other cylinders of the engine and momentum of the flywheel are necessary to keep the individual pistons moving during the other three strokes.

Beyond efficiency, further concerns are the cost, weight and complexity of the engine assembly and rate of wear of components and also subsidiary issues such as the extent of emission of environmental pollutants.

Whereas a number of different approaches to engine design have been investigated over the years, little has been published on designs of rotary internal combustion engines other than the famous Wankel engine invented in 1959 by German engineer Felix Wankel. The Wankel engine is based upon the use of a rotor mounted on a shaft to rotate within a housing, the rotor being adapted to sweep out an epitrochoidal or hypertrochoidal volume within the housing in order firstly to induct a fuel/air mixture into the housing to fill a combustion chamber between the rotor and the housing inner wall and to then compress it before combustion and the consequent movement of the rotor by the expanding gases to a position at which the combustion products are exhausted.

This design of rotary engine is apparently the only design that has had any substantial form of commercial acceptance. Nevertheless it is used in only a limited number of production cars and has been criticised for its relatively poor balance between fuel economy, performance and cost of manufacture.

The potential for rotary engine designs to improve on some or all of these characteristics and to better the conventional piston-based engines has not previously been fully realised and greater simplicity and efficiency may be achieved than heretofore.

SUMMARY OF THE INVENTION (A) Alternators

According to a first aspect of the present invention there is provided an alternator comprising a housing accommodating, a rotor and a stator, and, in use, a drive shaft for the rotor, which alternator has no moveable bearings within the housing supporting the drive shaft for the rotor.

Preferably the alternator has no bearings at all within the housing for supporting the drive shaft. This is most especially appropriate where the alternator is to be mounted to an existing drive shaft of, for example, an internal combustion engine.

Particularly suitably, the alternator has a rigid aligning plate arranged to centre the housing and stator rigidly over the drive shaft. A plurality of long bolts is suitably further provided to rigidly bolt the housing and stator to the rigid aligning plate.

Preferably, the rigid aligning plate has a convex profile, suitably arching toward the front of the alternator, to enhance its strength and the rigidity, which it imparts to the alternator assembly.

The alternator housing suitably comprises a casing comprising a front casing part and a rear casing part and the stator is sandwiched between the front casing part and the rear casing part forming a substantially rigid box structure around the drive shaft.

Preferably the rigid aligning plate is secured to the rear external face of the rear casing part.

Preferably, the alternator is without an integral drive shaft for the rotor, the alternator having a passageway therethrough, including through the rotor, to mount onto an existing drive shaft. Such existing drive shaft is suitably integral with or coupled to a motor such as, for example, the internal combustion engine of a car or other vehicle and the alternator housing is suitably adapted to be bolted to a rigid structure or housing from which the existing drive shaft protrudes and by means of which the alternator is centered over the drive shaft. In principle, the motor may be any supplier of motive force and could, for example, be a wind-driven propeller or water-driven impeller or the engine of a large or small powered appliance of any type.

The alternator suitably has a plurality of rotors within the alternator housing which are mounted, in use, at spaced intervals along the drive shaft. Suitably the housing of the alternator has a respective spacer element/plate to separate each rotor and/or stator from each adjacent rotor and/or stator. By having plural rotors and suitably also plural stators, the alternator has a much higher power output potential for the single drive shaft and for a minimal alternator size and weight.

In an alternative embodiment, the alternator may have an integrally assembled rotor drive shaft without moveable bearings supporting the drive shaft. Suitably the drive shaft is supported substantially wholly by a terminal bearing at one end of the shaft which is mounted to the rigid aligning plate. This embodiment is particularly suitable for use as a manually cranked charging device. For this purpose it may be provided with a crank handle.

Preferably, the device further has one or more charge storage devices accommodated within the alternator housing or an extension or adjunct thereto. Suitably the charge storage devices comprise battery cells. The battery cells are suitably further augmented by capacitors to provide optimal rapid controlled release of the charge.

In a further aspect of the present invention there is provided a charging device which comprises an alternator having a housing, a rotor or rotor assembly and a stator or stator assembly and a drive shaft for the rotor and further having a crank handle mounted to the drive shaft for the rotor whereby the drive shaft may be manually rotated (preferably through a turns-ration gearbox) in order to generate an alternating current. This device is preferably further provided with one or more charge storage means and particularly preferably has one or more battery cells accommodated within the housing suitably together with one or more capacitors for controlled discharge of the stored charge.

This hand cranked charging device may have a multitude of different applications including not only charging of car batteries or jump starting of car engines, but also applications such as powering of medical cardiac resuscitation units or even pacemakers. This device of the present invention may prove invaluable in emergency situations where the level of charge status of the existing battery powered equipment cannot be relied upon.

(B) Rotary Internal Combustion Engines

According to a first aspect of this invention there is provided an improved rotary internal combustion engine, which engine comprises: a housing; a rotor mounted on a rotary power output shaft, the shaft and rotor being mounted within the housing, the rotor having at least one recess defined in or on a radially outer face thereof outermost from the shaft, which recess is enclosed by the housing to define a substantially fixed size combustion chamber that does not vary as the rotor rotates, the housing further having an inlet port to supply compressed air to the combustion chamber and an exhaust port for removal of combustion products from the combustion chamber.

In contrast to the conventional Wankel and other rotary internal combustion engine designs, the volume defined within the combustion chamber throughout the rotary cycle of the engine remains substantially constant since it is not relied upon to perform the compression step of the combustion cycle. Instead, the air is supplied into the engine pre-compressed to substantially the required compression level.

In the preferred embodiment the rotor has a substantially circular cylindrical form and is particularly preferably a substantially circular disc. The recess, and preferably there are several of them spaced at regular intervals around the rotor, is preferably formed in the radially outer face of the rotor during casting of the rotor. Alternatively it may be milled out, or part cast and then milled out, from the radially outer surface of the rotor most notably for high performance engines.

Preferably that part of the housing which substantially concentrically encircles the rotor to enclose the or each recess is a discretely formed annulus, or sleeve.

This housing annulus is preferably a uniform single piece metal/alloy casting in which are provided the fuel and air inlet and exhaust ports.

The air inlet port for the compressed air preferably incorporates, in use, a combined compressed air/fuel injector nozzle.

Preferably the or each recess of the rotor has a venturi throat.

The lateral profile of the or each recess is preferably substantially a chord of a circle for a first part of its length and transitions to bend radially outwardly to provide a stop wall, functioning as a vane for turning of the rotor.

For optimal strength, integrity and weight reduction the rotor is preferably integrally formed with the shaft.

Particularly preferably, the engine has operably mounted to the rotor drive shaft an alternator/generator rotor to provide electricity that may be used to power the compressor pump for the supply of compressed air, for example. The stator of the alternator/generator is preferably secured directly or indirectly to the engine housing. Other inventive aspects of the present invention may include a rotor, a housing annulus and an alternator/generator all suitable for use in the manner described. Further benefits and inventive features of the present disclosure will become apparent from the following description.

BRIEF DESCRIPTION OF THE DRAWINGS (A) Alternators

Two preferred embodiments of the present invention will now be more particularly described, by way of example, with reference to the accompanying drawings, wherein:

FIG. 3 is a transverse sectional view of the second preferred embodiment of alternator adapted as a stand alone unit for manual operation;

FIG. 4 is a view of me components of the second embodiment separated from each other.

Figure 10A:
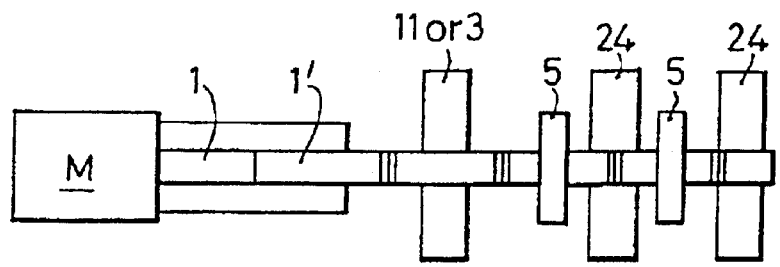
Figure 10B:
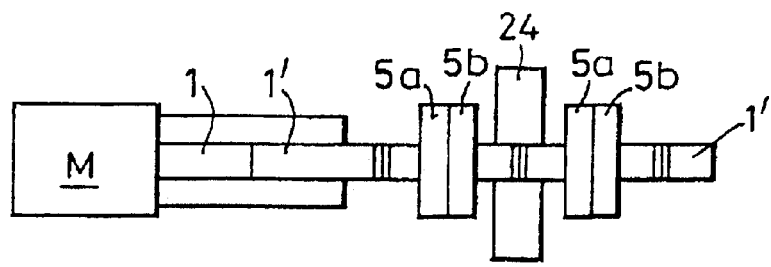
Figure 11A:
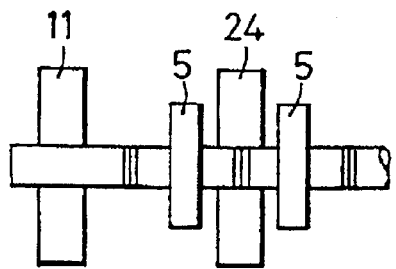
Figure 11B:
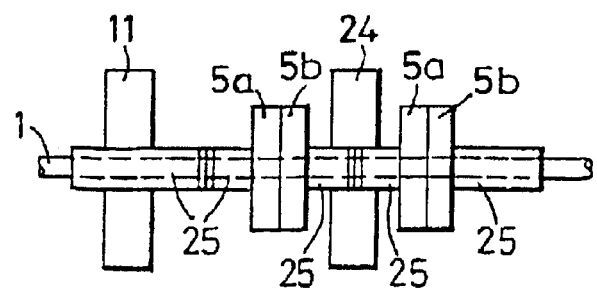

FIGS. 10a–10b demonstrate the positioning of multiple rotor, multiple stator configurations where the driving shaft is coupled to another shaft and FIGS. 11a and 11b illustrate schematically a configuration of assembly where the alternator is mounted on its own shaft and supported by a bearing aligning plate.

(B) Rotary Internal Combustion Engines

A preferred embodiment of the present invention will now be more particularly described, by way of example, with reference to the accompanying drawings, wherein:

FIG. B1 is a schematic transverse sectional view of an assembled rotary internal combustion engine embodying the invention;

FIG. B2 is a top plan view of an upper half of the housing/casing of the FIG. B1 embodiment and FIGS. B3 and B4 are, respectively, a side elevation view and a plan view from beneath of the upper half of the casing;

FIGS. B5, B6 and B7 are, respectively, a plan view from beneath of the lower half of the casing and a side elevation and top plan view of the same;

FIGS. B8, B9 and B10 are, respectively, a schematic isometric view, an end elevation view and a side elevation view of a rotor of the invention;

FIGS. B11A–C are isometric scrap views of seals for use in sealing the combustion chamber;

FIG. B12 is an end elevation view of the rotor taken from the right hand end in FIG. B10;

FIG. B13 is an end elevation view of the housing annulus;

FIG. B14 is a top plan view of the lower casing/housing half and with the rotor in place but shown schematically;

FIG. B15 is an isometric view of the housing annulus of FIG. 13;

FIG. B16 is a transverse sectional view of an alternator/generator module which may be assembled onto the rotor as illustrated in FIG. B1 to generate electricity to power the external air compressor;

FIG. B17 is a view of the components of the alternator/generator apart to illustrate their assembly;

and FIGS. B18, B19 and B20 are, respectively, an end elevation view of the assembled engine housing from a first end, from one side and from the other end.

DESCRIPTION OF THE PREFERRED EMBODIMENTS (A) Alternators

Figures 1, 2:
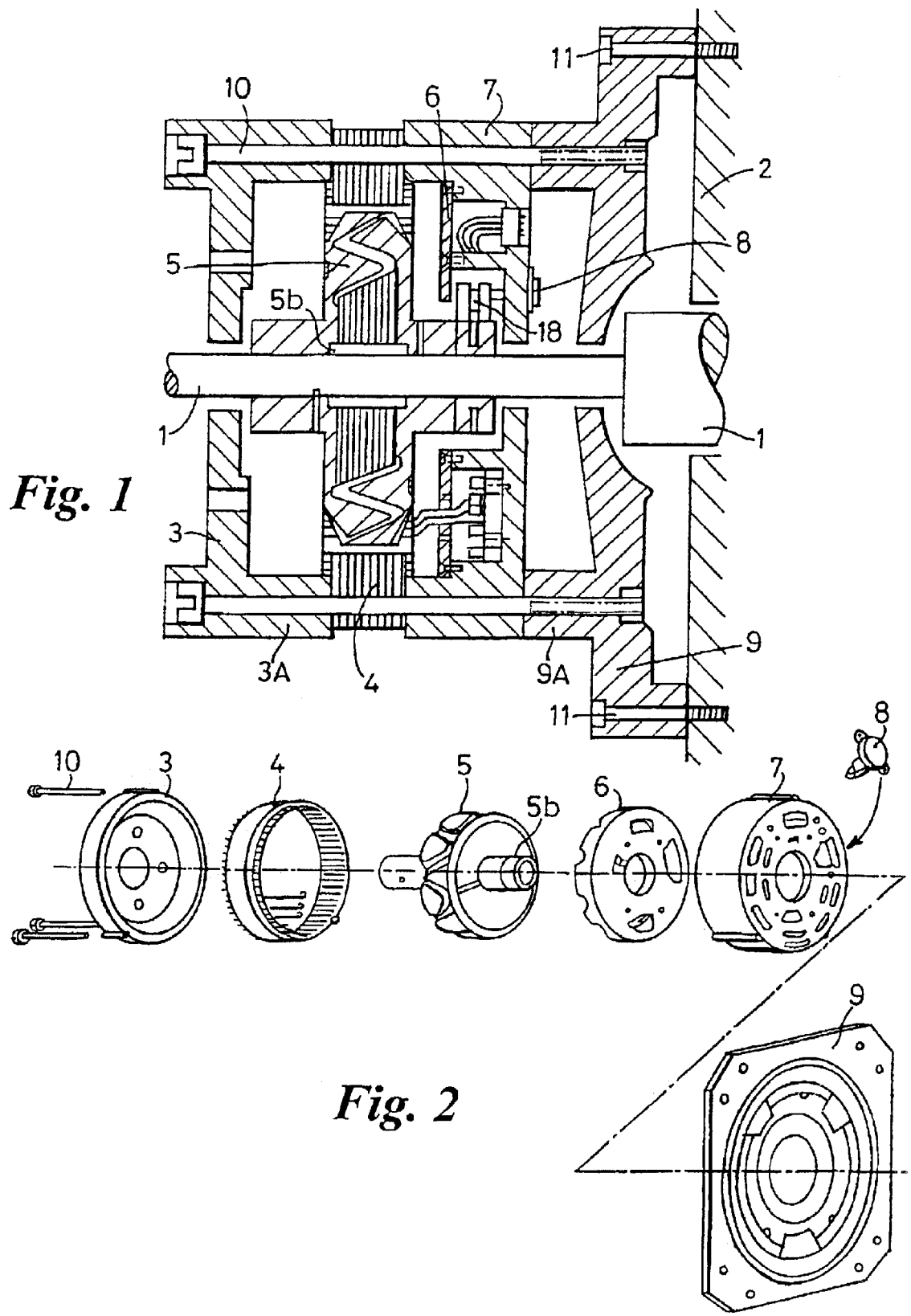
FIG. 1 is a transverse sectional view of the first preferred embodiment of alternator mounted on to the drive shaft of an engine.
FIG. 2 is a view of the components of the alternator separated to illustrate their assembly.
Figure 5:
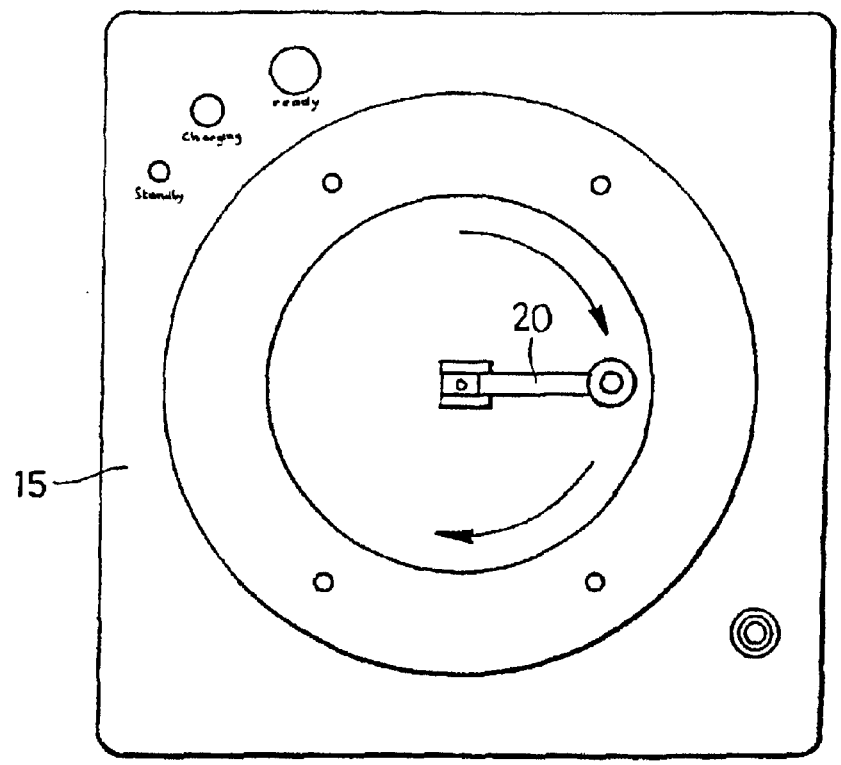
FIGS. 5 and 6 are respectively front and rear elevation views of the second preferred embodiment.

Referring firstly to the embodiment of FIGS. 1 and 2, this embodiment of the invention is adapted to be retrofitted onto a drive shaft 1 extending from and powered by an engine. The drive shaft 1 may suitably be directly coupled to the engine and projecting from the engine casing. The alternator mounts concentrically over the drive shaft 1 and is bolted to the engine casing 2.

The alternator comprises, in sequence from the front as illustrated: a front casing portion/plate 3 of the alternator housing; the stator 4; the rotor 5 having a hollow bore 5b to mount directly onto the engine drive shaft 1; a brush holder plate/diode plate 6; a rear body plate rear casing part 7 carrying the diode plate (b) and regulator 8 and multiplug for the generated electrical supply; and a rigid rear aligning plate 9; the whole assembly being fastened together by long bolts 10.

The rigid rear aligning plate 9 provides the backbone for the assembly. It has a forwardly arching convex profile for added strength and rigidity. The front casing portion, or front casing plate, 3 and the rear aligning plate 9 each have an upstanding circumferential wall 3a, 9a, respectively which face towards each other and which sandwich the stator 4 and rear body plate, or casing portion 7 between them and collectively forming a rigid cylindrical box structure.

The bolts 10 extend through respective apertures in circumferential radially spaced apart turrets on each of the front casing plate 3, stator 4, rear body plate 7 and into the rear aligning plate 9 to give the assembled unit structural integrity. The rear aligning plate 9 is, In turn, secured by bolts 11 with spring washers to the engine casing 2 in a rigidly supportive manner, holding the alternator housing in a fixed concentric position around the drive shaft 1.

As will be seen, there are no moving bearings surrounding the drive shaft 1. This is in marked contrast to conventional alternator construction which generally entails provision of ballbearings or other moving bearings such as cased or needle bearings between the rotor drive shaft and alternator housing to support and maintain the concentricity of the rotor drive shaft. In this first preferred embodiment there is no need for any form of bearing between the drive shaft 1 and the alternator housing comprising the components 3, 4 and 7. The only necessary contact is between the brushes 18 on the brush holder and diode plate 6 and the collector rings commutators on the rotor 5.

Partly as a result of there being no moving bearings required within the housing but also as a result of the rotors 5 being formed with a continuous through passage through their width to mount onto a drive shaft to enable them to be mounted positioned at any of a number of chosen locations along the drive shaft there is, furthermore, little substantive limitation on the number of rotors 5 that may be mounted onto the drive shaft 1 within the alternator housing. A number of such rotors 5 may be positioned along the drive shaft 1 at spaced intervals, suitably separated by spacer plates 24 (see FIGS. 7 to 11). The spacer plates 24 may have a form or dimensions similar to the rear body plate 7, for example, and serve to isolate each rotor 5 and stator 4 from each adjacent rotor 5 and stator 4. In such arrangement the front casing plate 3 may be strengthened like the rear aligning plate 9 by altering its shape to be similar to that of the rear aligning plate 9 or by augmenting it with a further plate. Furthermore, the diode and regulator 8 and multiplug and any other electrical processing components are suitably repositioned to an end plate and may be located on a circumferential outer surface of the plate.

Figure 7A:
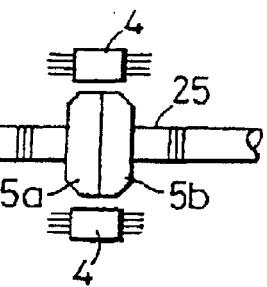
FIGS. 7a–7d are simple schematic diagrams of configurations of alternator comprising multiple rotor and single stator or multiple rotor and multiple stator assemblies.
Figure 7B:
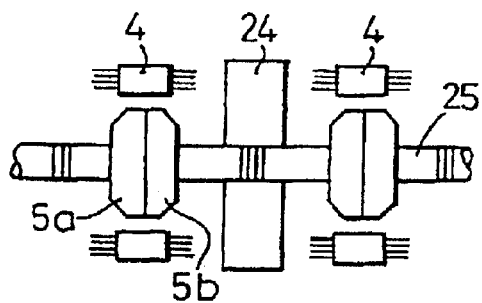

Referring to FIGS. 7a–d, in the first of these the rotor 5 is formed of a pair of rotors 5a, 5b secured together and rotating within a common stator 4. In FIG. 7b there is not just one pair of rotors 6a, 5b with associated stator 4 but also a further pair of rotors 5a, 5b and stator 4 in series with the first one and spaced from it by a spacer plate 24.

Figure 7C:
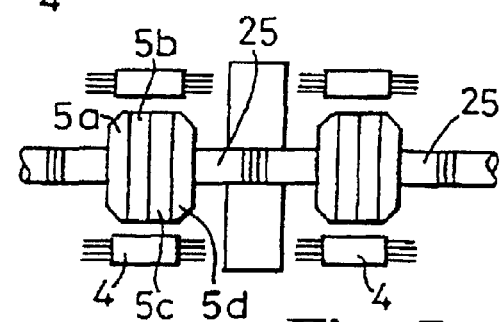

FIG. 7c is similar to the configuration of FIG. 7b but having four rotors 5a–d back to back within each stator 4. The rotor windings are suitably soldered together in passageways through the rotor farmers.

Figure 7D:
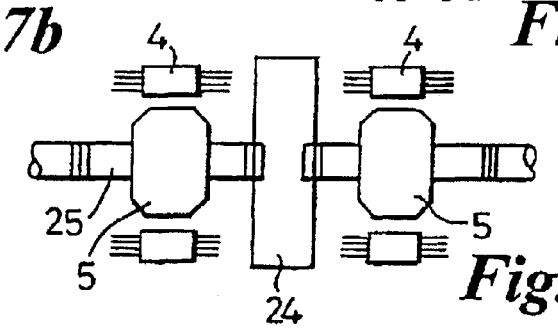

In FIG. 7d the configuration is similar to the configuration of FIG. 7c but with a single rotor associated with each stator.

FIGS. 8a to 8g show different variants of rotor. The first of these has a tubular extension 25 bearing commutator 26 provided on one side of the rotor 5 only. A tubular extension bearing commutator may, alternatively, be provided extending in each direction from a respective one of a pair of back to back rotors as in FIG. 8b.

Figure 8A:
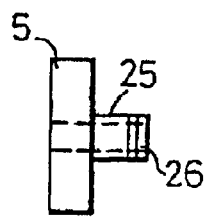
FIGS. 8a–8g are simple schematic diagrams of alternative variants of rotor.
Figure 8B:
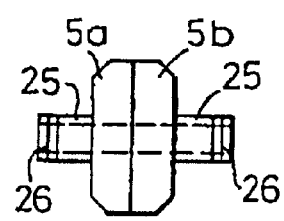
Figure 8C:
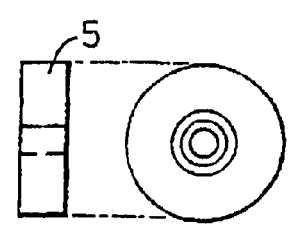
Figure 8D:
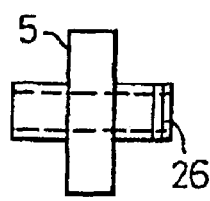
Figure 8E:
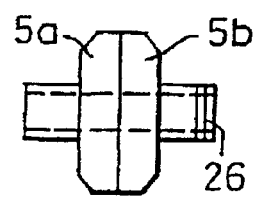
Figure 8F:
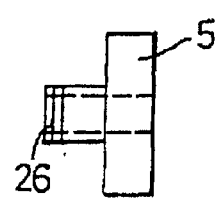
Figure 8G:
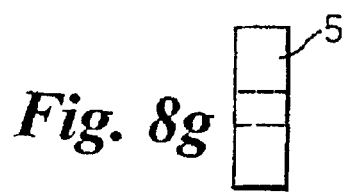
Figure 9A:
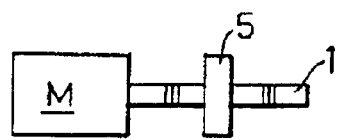
FIGS. 9a–9d are simple schematic diagrams illustrating the location of the different rotor configurations relative to the driving shaft.
Figure 9B:
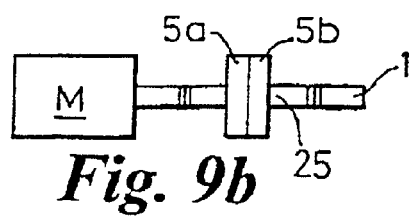
Figure 9C:
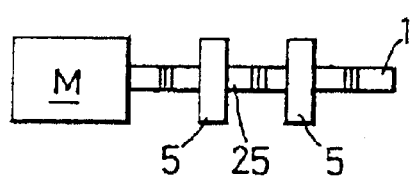
Figure 9D:
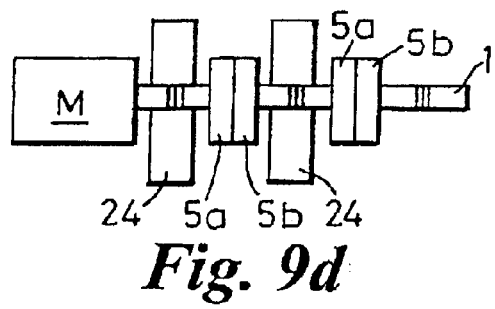

The rotor may alternatively, as in FIG. 8d, have a tubular projection from each face of the rotor but need only have a commutator 26 on one of the projections. In the rotor of FIG. 8g there is no projection with commutator. A commutator may be provided separately.

Where twin rotors are provided these suitably comprise two single rotors screwed together and of which the commutators are soldered together through the respective former winding blocks.

To assist mounting of any additional front plate to the front of the front casing plate 3, which may be used, for example, to carry a pointless ignition unit for a car engine or for strengthening, the long bolts 10 suitably have heads with threaded sockets to receive further bolts.

Turning now to the second of the two illustrated embodiments, as shown in FIGS. 3 to 6, this comprises a completely self-contained alternator unit. Here the alternator unit has its own rotor drive shaft 12. This alternator, furthermore, has its own charge storage units/batteries 13 built into the alternator housing to make the device wholly independent and suitable for use, for example, as a manually re-chargeable power supply for jump starting a car where the car's battery is flat or for powering a cardiac resuscitation unit.

The general configuration of the components is substantially the same as for the first preferred embodiment and like parts carry like numbering.

Figure 6:
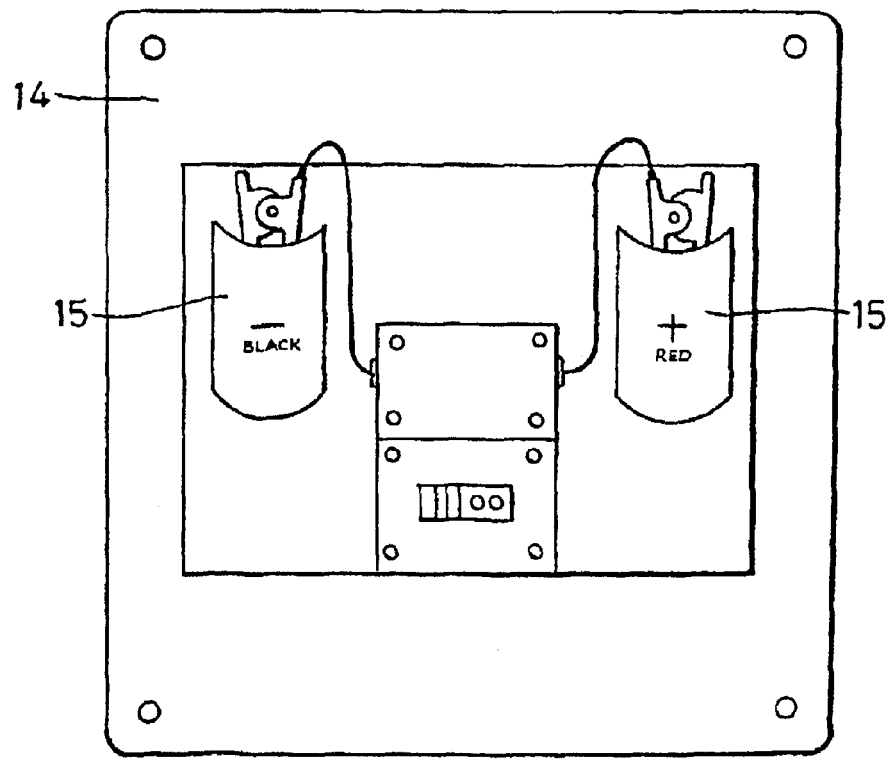

The most notably differently shaped common component is the rear aligning plate 9' which, in its rear face, is flatter than the rear casing plate 9 of the first embodiment since it does not need to conform to the shape of a fixed structure for mounting. Instead, the relatively flat rear casing plate 9' of the second preferred embodiment is enclosed on its rear face by a covering plate 14 which, as illustrated in FIG. 6, is suitably provided with the respective positive and negative output electrodes with crocodile clips housed in pockets on the rear face of the unit. This cover 14 may also suitably accommodate further electrical circuitry including capacitors etc.

The front face of the unit is provided with a front cover 15 that bolts to the front casing plate 3 by short bolts that screw into the threaded heads of the long bolts 11. The front cover suitably further has side walls which extend therefrom to surround the componentry of the alternator and serve to extend the housing laterally to house the battery cells 13 and any other desired processing circuitry.

The rotor drive shaft 12, is pinned to the rotor 5 and is supported within the alternator housing substantially solely by a terminal support bearing 16 at the rear end of the shaft 12. This bearing 16 has a cup-shape and is suitably lined with gauze or other low friction lining with oil lubricant. The bearing 16 is a static bearing and because of its terminal positioning allows for the possibility of mounting a plurality of rotors 5 onto the drive shaft 12.

Rigid holding of the drive shaft 12 is assisted by the rear body plate 7 pressing down against the outer rim 21 of the cup-shaped bearing 16. Indeed, as will be seen from FIG. 3, the central aperture of the rear body plate 7 through which the shaft 12 extends has a stepped bore rim 22 which accommodates the outer rim of the bearing.

As with the first preferred embodiment, the rotor 5 has a hollow bore through which the drive shaft 12 extends. It may be held to the shaft 12 to rotate therewith either by a tight friction fit or by longitudinal splints along the outer circumference of the drive shaft 12 or, indeed, by use of pins 17 or screws.

Further in contrast to the first preferred embodiment, the drive shaft 12 is adapted to be rotated manually by use of a crank handle 20. A guide annulus 23 is provided in the front casing plate 3 through which the drive shaft 12 passes and which assists centering of the shaft 12.

Operation of the handle 20, suitably through a turns-ratio gearbox (not shown) enables generation of a current that may be fed directly to an electrically powered appliance, possibly via intermediacy of one or more capacitors. Electronic componentry including switch circuitry is suitably provided to enable selection between different modes of operation. For many purposes the ability to store high levels of charge in the in-built battery cells may be the most important facility. High efficiency batteries such as gel batteries are preferred.

This facility enables use of the device to power a portable cardiac resuscitation unit, for example. The performance of the unit may, for this and other purposes, be further enhanced by incorporating suitable gearing which may most conveniently be mounted to the front end of the device—perhaps in a casing that is mounted to the front body casing 3. A step-up transformer is suitably also incorporated into the device. Although it is particularly preferred to configure the device to have multiple rotors and stators within the alternator housing it is alternatively possible to use multiple separately housed alternators together mounted in series to a common drive shaft.

The device of the first embodiment of the present invention when used in series can efficiently re-charge a car battery from one alternator while directly powering an electric car motor.

The system may lessen the need for large numbers of batteries and lead to electric powered vehicles becoming truly viable. This may apply not only to cars but potentially also to other vehicles such as electrically powered aircraft, for example.

The benefits of the present invention may be realised in powering or charging a wide variety of vehicles or appliances.

(B) Rotary Internal Combustion Engines

Referring firstly to FIG. B1, this overview of the internal combustion rotary engine encased in its housing 5 illustrates the engine's rotor 1 in section as comprising a circular disc with a drive shaft 2 integrally formed with the rotor 1, the drive shafts axis extending substantially centrally through the rotor 1.

The rotor 1 is formed as a single casting from a suitable metal or alloy to have the substantially circular disc shape and with substantially axially central projections extending perpendicular from each opposing side to definine the shaft 2. The drive shaft 2 is to be coupled to the drive shaft of the motor vehicle or other load directly, by gearing or any other suitable means.

In contrast to conventional piston engines, the rotor 1 with its integral shaft 2 is substantially the only moving part of the engine. There is no need for a crank shaft to convert reciprocating motion to rotary motion since the motion of the primary motive component of the engine is rotational from the outset.

In contrast to conventional rotary engines, which generally have convex radially outer faces, the rotor 1 has one or a plurality of recesses 3a–d formed or otherwise defined in its radially outer face(s), outermost from the shaft 2 (see FIGS. B8 to B10).

The radially outer faces may alternatively be described as the cylindrical outer face of the rotor 1.

Where the recesses 3a–d are formed in the process of casting the rotor 1 they may be subsequently further machined to provide an accurately defined profile.

As can be seen in FIGS. B8 to B10 the preferred side profile of each recess 3a–d takes the form substantially of a cord of the circular shape of the rotor 1 for two thirds of the recess length approximately but upturning towards its end. This upturn forms a stop wall 7 for the expanding combustion gases within the combustion chamber defined by the recess 3a–d whereby this part of the rotor 1 acts as a vane of the rotor 1 to propell the rotor 1 in forward rotation. Furthermore, when viewed in plan each recess 3a–d has a narrow waist or throat 8, part-way along its length, (see FIG. B10) whereby the recess has a Venturi channeling effect to accelerate injected fuel and compressed air towards the stopwall 7.

The limits of each recess 3a–d are bounded by suitable sealing members 4, to seal against the housing 5 to thereby define the discrete gas tight combustion chambers. That part of the housing 5 which encircles the rotor 1 circumference and encloses the combustion chambers/recesses 3a–d is a discretely formed annular component or sleeve, referred to herein as housing annulus 6.

The housing annulus 6 is formed as a uniform single piece metal/alloy casting in order to maintain uniform seal integrity and rotational freedom of movement as the seals 4 sweep around the annulus 6.

The housing annulus 6 incorporates around its circumference an aperture for each of: an oil injector 10 for lubrication of the outside of the rotor 1; a combined compressed air-fuel mixture injection nozel 11; a platinum electrode spark plug 12; and the exhaust 13 leading to exhaust pipe 33 in the lower casing half 5b.

The oil injector 10, air-fuel nozel 11 and spark plug 12 are all mounted in an injection support block 16 on the upper casing half 5a.

A further aperture in the housing annulus 6 is an oil outlet 14 associated with a magnetic oil filter.

The supply of oil for the engine is circulated through channels 31a in the upper casing half and down through to channels 31b in the lower casing half before passing through the oil outlet 14. These oil channels 31a, b lubricate the shell bearings 17 for the rotor shaft 2 while oil from the oil injector 10 lubricates the rotor 1 itself.

Cooling of the engine is preferably by virtue of a fan-driven air cooling system. The engine casing upper and lower halves 5a, b are provided with cooling fins 32.

The electrical power for the air cooling fan and for the air compressor to supply the compressed air for the engine's operation is suitably primarily generated by an alternator/generator module 29 that is directly coupled to and driven by the rotor drive shaft 2.

This alternator/generator module 29 is illustrated on the left hand side of FIG. B1 and again in FIG. B16. It comprises a casing that is fastened directly to the upper and lower housing/casing halves 5a,b of the engine and with the alternator/generator's rotor 23 mounted directly over the engine rotor's drive shaft 2. As illustrated, that part of the engine rotor drive shaft 2 that supports the alternator/generator rotor 23 is an extension portion 2b that also serves as a timing rod for synchronising the engine's timing mechanism 30. Depending upon the length of this extension 2b any number of alternator/generators 29 may be coupled to the engine and driven by it In FIGS. B16 and B17 the primary components of the alternator/generator module 29 are the module front casing plate 20, the stator 21, the alternator/generator rotor 22 having a shaft 23 with a hollow bore to mount directly over the engine drive shaft extension 2b, a brush holder plate 24, a rear body plate 25 carrying a diode and rectifier 26 for the generated electrical supply, and a module rear casing plate 27, with the whole assembly being fastened together by long bolts 28.

This structure effectively enables the alternator/generator rotor 22 to be supported by the engine drive shaft 2 in a floating manner.

Operation of the Engine

A starter motor (not shown) turns the flywheel 9 in a clockwise direction. All injection timing and ignition timing are made at the timing point 30 in conjunction with a controller system box.

A fine mist of synthetic oil is injected onto the four rotor seals 4 in conjunction with one revolution of the rotor 1 in the housing 5 during start up, the oil being metered in accordance with the engine power out put. Oil is fed to the end shell bearings 17 of the engine housing 5, by pumping oil through channels 31a in the bore cases to holes in the end caps 18 through the shells 17 to the bearing faces. There are also channels 31b leading away from the bearings to the magnetic oil filter 14 and so back into the oil return system.

When a rotor seal 4 has reached top dead center, this is directly beneath the oil injector 10, the oil injector 10 is sealed off. The twin fuel/high compression air injector 11, injects fuel and air into the combustion chamber recess 3a.

As soon as the fuel/air injector 11 has injected the fuel into the combustion chamber 3a and while the rotor 2 is still rotating in a clockwise direction, the trailing seal 4 of the first combustion chamber 3a has passed beneath the fuel/air injector 11, sealing it off, then the platinum electrode spark plug 12 ignites the mixture. The expanding gas moves away from the ignition point and acelerates through the venturi throat 8 into the bowl part at the end of the combustion chamber impacting against the stopwall 7 and driving the rotor 1 forward and down in a rotational path.

This process is repeated as the next chamber 3b comes into alignment and its trailing seal 4 reaches top dead center and for all subsequent steps. This is all happening while the piston structure is still rotating in a clockwise direction.

As the rotor 1 rotates past the open oval exhaust port 13 the spent gases with some of the oil will escape from the combustion chamber 3a–d into the exhaust pipe 33. In the illustrated "4-step" engine, every quarter turn of the rotor 1 initiates a new firing cycle, or "step".

Every cycle (step) results in a power step driving the piston structure forward and down in rotation, each step is directly behind the last.

This type of engine should be able to run on more than one type of fuel. (Town gas, Methane, Methyl Alcohol, Petrol, Petrol Ethanol, Ethanol, Gasohol, Water).

The spark plug 12 used preferably has one center platinum electrode and a varying number of ground electrodes. Platinum being an inert metal is highly conductive and resistant to chemical erosion. In the use of this type of spark plug 12 the platinum electrode will draw Hydrogen from the water vapor that is produced from the highly compressed air, and in return this will produce a more intense bum of fuels in the combustion chamber 3a–d.

The use of voltage and frequency splitting in the electrical supply to the spark plug 12 provides that instead of one spark from the center electrode to the ground electrodes there could be many. This enhances high yield bum in the combustion chamber.

The alternator/generator module 29, powers the compressor pump for the compressed air supply and may also be used to run a direct air cooling system for the engine and to keep the battery charged.

Suggested Protocol for Assembly of the Engine

Set the lower casing 5b on a bench. Insert the lower shells 17 into the end bearings (not shown), then oil the shells 17 liberally. Check and clean the studs and their threads (not shown) for the lower bearing cases. Using a special tool screw in the studs into their corresponding bearing blocks (not shown).

Wearing heat protective clothing pre-heat the rotor 2. Then slide the rotor seals 4, into their spring tubes 4b, then slide the completed assemblies into their corresponding slots, In the rotor 1 point up.

Lightly oil the inner part of the annulus 6, using a clean cloth damped with dean engine oil. Insert the rotor-shaft 2 (with the help of the special compression tool) making sure that the flywheel 9 end is to the left at the rear of the lower casing half 5b and the timing rod 2b is to the right at the front of the lower casing half 5b. Together they are lowered into the lower casing 5b making sure, that the oval hole 13 in the sleeve ring lines up with the exhaust hole 13, 33. If correct the annulus and mounting flanges 15 will locate property in the lower casing 5b.

Insert the upper shells 17 into the end bearing caps 18 then liberally oil the shells 17, and lower the caps into position with the corresponding lower bearing part of the lower casing 5b to hold the rotor shaft 2. The lower housing 5b, may for ease of proper orientation, be marked with an F for the front and R for the rear. Now place their nuts on their studs and tighten them evenly to their specified torque settings.

If the torque down was correct then there will be free rotation from the rotor 1.

Place the engine's gaskets on their corresponding sides over the hollow securing turrets on the lower casing 5b. These are suitably marked <L for left and R> for right, and these markings should be face up.

Fitting the upper case 5a, make sure the three holes 10,11,12 in the housing annulus 6 line up with the corresponding holes in the upper case 5a. Lower the upper case 5a over the housing annulus 6 making sure the two halves 5a, 5b meet properly.

Do Not Force.

Secure the through bolts from the lower case 5b "bough ends" of the engine through to the upper 5a (the bough ends are suitably shaped like handles) put nuts on and hand tighten. These four through bolts will later secure the engine mounting plates to the engine.

Secure the oil connectors to and from the end bearings from the oil channels 31 in the casings 5a, 5b. Place the oil seal housing end plates 19 over the upper end bearing caps. These plates 19 only fit one way for the front or rear.

Turn the engine assembly over and insert the remaining bolts, make sure to use locking fluid, using a "T" bar tighten down in appropriate sequence and then tighten them to their specified torque settings.

Place the engine back into an upright position.

Place the rotor shaft 2 front oil seal gasket on the complete oil seal assembly. Guide the assembly over the protruding rotor-shaft 2, and insert eight short bolts through the assembly and tighten evenly to specified torque settings. Repeat the procedure for the rear rotor shaft 2 oil seal assembly, these will square up the oil seal housing end plates 19. The correct orientation for the oil seal assemblies are suitably marked upright (F) for front and (R) for rear.

Align and secure the oil injector 10, the twin fuel and air injector 11 and screw the spark plug 12, into the injector block housing unit 16. Connect this housing unit 16 to the top of the engine using a treated cork gasket, this unit 16 will only secure one way. Insert six short bolts and tighten them evenly to their specified torque settings. Connect the oil feed to the block oil channels 31 and oil injector 10, connect the fuel feed and air feed to the twin fuel and air injector 11 and connect the voltage and frequency splitter to an HT lead which is then connected to the spark plug 12.

Insert and secure the exhaust manifold/down pipe 33. (This is a one piece unit). Make sure to use an oval gasket, insert the securing bolts, tighten to their specified settings.

Position and secure the alternator/generator module 29. Secure the module's rear casing plate 27 onto the engine casing 5 over and in front of the oil seal housing end plate 19. The module's rear casing plate 27 has three or four nuts secured in short hollowed turrets, in a triangle or square arrangement one up two down or two sets in parallel. The rear body casing 25 of the alternator/generator 29 is then positioned on the turrets making sure to connect up the cable to a multi-plug of the module 29. The rear body plate 25 houses the multi-plug, regulator 26 and brushes and diode plate. The large hollow alternator rotor 22 goes on the front of the engine. Secure the alternator rotor 22 front rotor face to the protruding engine drive-shaft extension/timing shaft 2b at its predetermined length position, making sure to use locking fluid on the securing screws.

Note: If the protruding engine rotor drive-shaft 2 is sufficiently long at the front of the engine, then the engine can support more than one alternator/generator module 29.

The stator 21 assembly is positioned and secured over the alternator's rotor 22 and the cables are coupled in the rear body casing plate 25. The module's front casing plate 20 is secured over the assembled alternator/generator assembly with three or four long bolts 28 and spring washers. These long bolts 28 have internally threaded heads. The long bolts 28 go through the front casing plate 20, through the stator assembly 21, through the diode plate, through the rear body plate 25 and then secure to the rear casing plate 27. (The upper surface of the front casing plate 20 doubles as the supporting plate for the pointless ignition unit).

Bolt the bell housing support ring in position using eighteen short bolts and washers, tighten them evenly to their specified settings.

Note: If a rear alternator/generator module 29 is present, one would have to connect the alternator cabling to the bell housing support ring inner face of the cable turret.

Bolt the flywheel 9 onto the protruding end of the rotor drive shaft 2, there is a centre guiding turret to align the flywheel 9, use five bolts to secure the flywheel 9 to the shaft 2. Before tightening put locking fluid on the short bolts, tighten hand tight then tighten them evenly to their specified torque settings. Torque down in sequence.

For assembling of a pointless ignition unit at the timing rod 2b end at the front of the engine, firstly fit a four bladed chopper over the timing rod and secure with a circlip, fit an optical switch housing assembly taking care not to damage the cable connector from the optical switch, then place and secure the optical switch housing assembly with four countersunk screws and star washers to the front casing plate 20 on the front of the alternator/generator module 29.

Screw the power module to the front inner surface of the outer casing-making sure to connect the shielded earthing strap to the power module, coupling the ignition unit to the power module, feeding the power module cables to the inner turret connector, connecting the alternator/generator cable to the inner turret. Finally bolt on the front outer casing with the eighteen short bolts and spring washers, and tighten securely.

Bolt the engine lifting brackets to the top of the upper bough ends.

Note: When the engine is in situ bolt in the magnetic oil filter 14 and connect the oil return system hose.

What is claimed is:

1. An alternator comprising a housing accommodating a plurality of rotors, a common stator and, in use, a drive shaft for the rotors, said alternator has no moveable bearings within the housing supporting the drive shaft for the rotors and wherein the plurality of rotors within the alternator housing being mounted, in use, on the drive shaft and rotating within the common stator, wherein the alternator is without an integral drive shaft for the rotors, the alternator having a passageway therethrough, including through the rotor, to mount onto an existing drive shaft, being mounted on the existing drive shaft, in use, and with the drive shaft extending through the full width of the rotors, whereby the rotors may be positioned at any of a number of chosen locations along the length of the drive shaft.

2. An alternator as claimed in claim 1, wherein the existing drive shaft is integral with or coupled to a motor such as, for example, the internal combustion engine of a car or other vehicle and the alternator housing is bolted, in use, to a rigid structure or housing from which the existing drive shaft protrudes and by means of which the alternator is centred over the drive shaft.

3. An alternator comprising a housing accommodating a plurality of rotors, a common stator and, in use, a drive shaft for the rotors, said alternator has no moveable bearings within the housing supporting the drive shaft for the rotors and wherein the plurality of rotors within the alternator housing being mounted, in use, on the drive shaft and rotating within the common stator, wherein there is a passageway through each rotor through which the drive shaft of the rotor extends through the full width of the rotors and whereby the rotors may be positioned at any of a number of chosen locations along the drive shaft.

* * * * *